United States Patent [19]

Pacholok

[11] Patent Number: 4,613,934
[45] Date of Patent: Sep. 23, 1986

[54] POWER SUPPLY FOR GAS DISCHARGE DEVICES

[76] Inventor: David R. Pacholok, 437 N. Crystal St., Elgin, Ill. 60120

[21] Appl. No.: 637,916

[22] Filed: Aug. 6, 1984

Related U.S. Application Data

[63] Continuation-in-part of Ser. No. 590,868, Mar. 19, 1984, abandoned.

[51] Int. Cl.$^4$ ............................................. H02M 7/537
[52] U.S. Cl. ....................................... 363/131; 363/97; 323/289; 315/DIG. 7
[58] Field of Search ....................................... 363/18–21, 363/49, 97, 131, 55-56; 323/289; 331/112; 315/DIG. 7, DIG. 4

[56] References Cited

U.S. PATENT DOCUMENTS

| | | | |
|---|---|---|---|
| 3,662,249 | 5/1972 | Wijsboom | 323/289 X |
| 3,700,956 | 10/1972 | Cluett | 331/112 |
| 3,753,075 | 8/1973 | Tomura et al. | 363/131 |
| 3,978,390 | 8/1976 | Remery | 363/131 |
| 4,220,987 | 9/1980 | Rao et al. | 363/21 |
| 4,316,242 | 2/1982 | Colangelo et al. | 363/21 |
| 4,443,838 | 4/1984 | Yamada | 363/19 |

*Primary Examiner*—Peter S. Wong
*Attorney, Agent, or Firm*—Lee, Smith & Zickert

[57] ABSTRACT

A low current, high voltage power supply for gas discharge devices, such as neon tubes. The power supply has a free-running oscillator which generates a high frequency voltage signal which drives a light-weight, compact transformer. The oscillator has a power transistor drive, and a second transistor is used to remove the base drive of the power transistor to render it non-conductive. The second transistor also provides a path for rapid evacuation of the charge carriers stored in the base-emitter junction of the power transistor to rapidly render it non-conductive when the second transistor is energized. A safety bypass circuit is provided should a fault occur with the gas discharge device.

15 Claims, 2 Drawing Figures

POWER SUPPLY FOR GAS DISCHARGE DEVICES

RELATED APPLICATION

This application is a continuation-in-part of copending application Ser. No. 590,868, filed Mar. 19, 1984, now abandoned.

BACKGROUND OF THE INVENTION

This invention relates to a low current, high voltage power supply for neon signs or other similar gas discharge devices and in particular to a solid state power supply which is far more efficient and less costly than conventional high voltage transformers used to excite gas discharge devices.

Gas discharge devices, such as tubes for neon signs, require a high voltage, typically between five to ten thousand volts or more, to stimulate the gas atoms therein sufficiently to emit radiation in the visible spectrum. In prior art neon tubes used in signs and the like, such high voltages are generally produced by a low frequency step-up transformer connected to a standard 60 Hz power line. However, due to the core requirements of power transformers designed to operate at such low frequencies, the resulting transformers are expensive, heavy and generally bulky.

In addition, since neon signs are usually placed in exposed areas such as store front windows, the likelihood of electrical shock due to inadvertent contact with the high voltage sign interconnections is increased. It is well known that inadvertent contact with low frequency voltage sources, such as conventional 60 Hz line power, generates a far greater hazard of serious injury or death than contact with a high frequency source of comparable voltage. Thus, a power supply of higher frequency provides an additional measure of safety over conventional transformers particularly in those environments where complete isolation of a neon sign from inadvertent human contact is not feasible.

SUMMARY OF THE INVENTION

The power supply of the invention utilizes a unique solid state free-running power oscillator to generate a high frequency power signal which drives a compact, light-weight high frequency transformer. The transformer delivers a sufficiently high voltage to excite the inert gas within a gas-filled tube in order to cause it to produce light. In this manner, the conventional bulky, low frequency step-up transformer is eliminated.

The transformer is of the type having leakage reactance. It has a primary winding, a feedback winding, and a secondary winding connected to the gas-filled tube. A transistor is employed, having its collector connected to the transformer primary winding and its base connected to the transformer feedback winding to provide a base current drive. When voltage is applied to the base of the transistor, the transistor conducts until the transistor comes out of saturation from increasing collector current. A solid state switch is connected to the primary winding and is activated when the transistor comes out of saturation in order to remove the base drive to render the transistor non-conductive. The switch also provides a path for rapid evacuation of charge carriers stored in the base-emitter junction of the transistor to rapidly render the transistor non-conductive.

In accordance with the preferred embodiment of the invention, the switch comprises a second transistor having its base connected to the transformer primary winding and its collector connected to the base of the first transistor in order to provide the rapid evacuation path for the base-emitter junction of the first transistor. The emitter of the second transistor is directly grounded.

BRIEF DESCRIPTION OF THE DRAWINGS

The invention is described in greater detail in the following description of an example embodying the best mode of the invention, taken in conjunction with the drawings, in which.

DESCRIPTION OF EXAMPLE EMBODYING BEST MODE OF THE INVENTION

Figure 1:
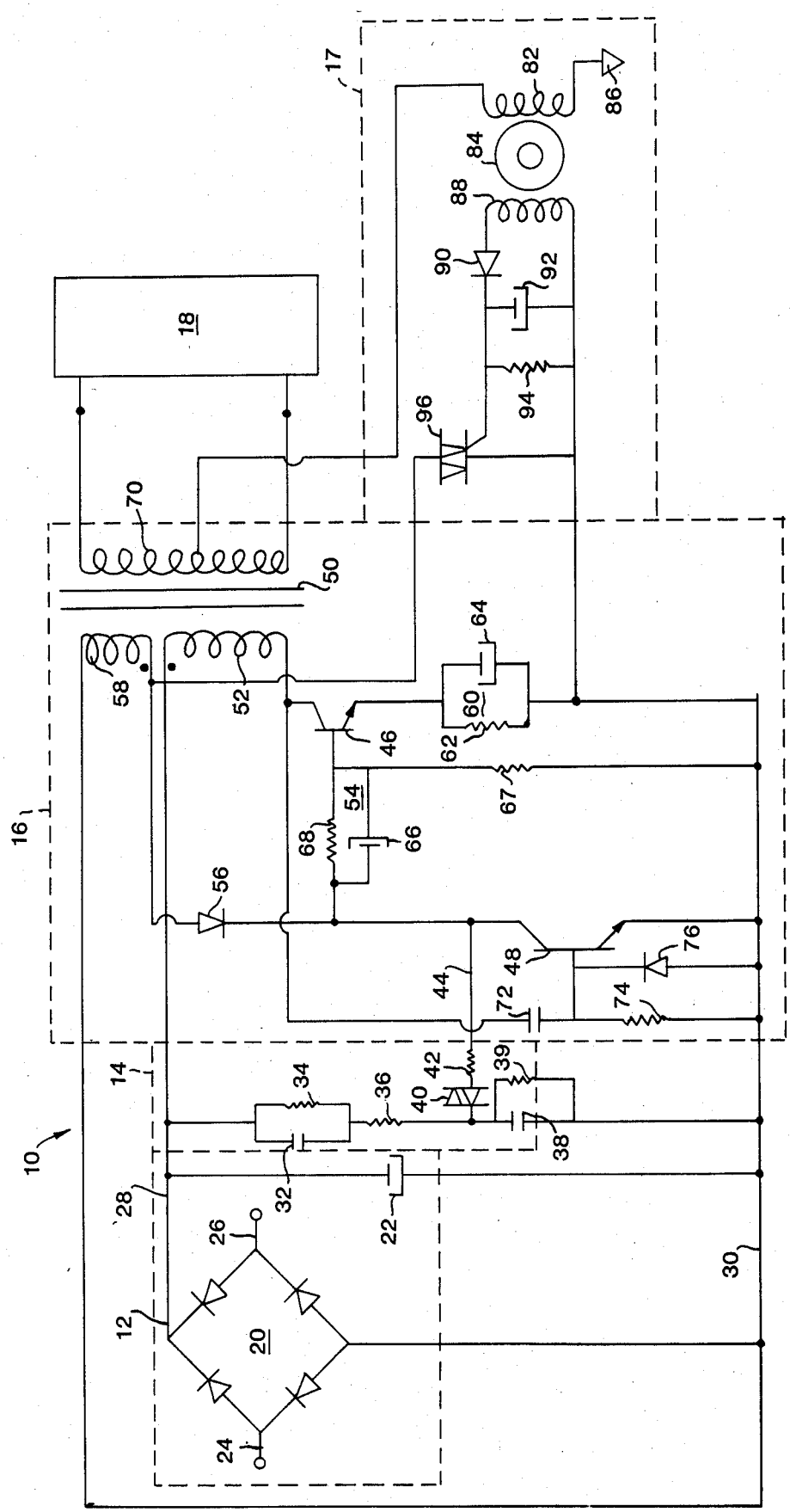
FIG. 1 is a schematic circuit diagram of one embodiment of the invention.

The neon sign supply of the invention is shown generally at 10 in FIG. 1. As primary elements, the supply 10 includes a power supply 12, a start-up circuit 14, a high frequency oscillator 16 connected to an output load 18, typically a neon tube or other similar device and a safety bypass circuit 17. The power supply 12 consists of a bridge rectifier 20 and a filter capacitor 22. The rectifier 20 is connected to a conventional 120 volt alternating current supply (not illustrated) through leads 24 and 26. The positive output of the power supply 12 is directed on line 28 to the start-up circuit 14 and the oscillator 16, while the negative output of the power supply 12 is connected to "ground" of the neon supply 10.

The start-up circuit 14 consists of the parallel combination of a capacitor 32 and resistor 34 connected at one end to the line 28 and at the other end in series with a resistor 36. The resistor 36 is connected through the parallel combination of a charging capacitor 38 and resistor 39 to the ground 30. It is also connected to a diac 40 in series with a current limiting resistor 42 on a line 44 leading to the oscillator 16.

The start-up circuit 14 operates as a relaxation oscillator in which the capacitor 38 is charged until the voltage across the capacitor 38 exceeds the threshold trigger voltage of the diac 40. The diac 40 then conducts, and when the current through the diac 40 has substantially stopped due to completion of the charge on the capacitor 38, the diac switches off, commencing a new and repetitive charge cycle. If the oscillator 16 is not previously in oscillation, the repetitive discharge cycles of the diac 40 initiate such oscillation.

The frequency of oscillation of the start-up circuit 14 is not critical, generally and preferably having a period initially of 200 Hz and later settling to a steady state of 10 to 20 Hz.

The oscillator 16 is a free-running high frequency oscillator comprising a power transistor 46, a low voltage switch transistor 48, an output and feedback transformer 50, and associated biasing and triggering circuit elements. It is preferred that the oscillator 16 nominally operate under load at a frequency of 25 KHz.

The power transistor 46 is of a common type having collector-emitter breakdown voltage rating of approximately 1500 volts and a maximum collector current nominally of 2.5 amperes. Such a transistor is commonly found in a television horizontal output circuit, and transistors having a collector current between two and seven amperes are suitable in this invention.

The collector of the transistor 46 is connected to the positive output line 28 of the power supply 12 through the primary 52 of the transformer 50. The base of the transistor 46 is connected through a biasing network 54 and a diode 56 to a transformer feedback winding 58, while the emitter of the transistor 46 is connected to ground through an emitter biasing network 60.

The emitter biasing network 60 comprises the parallel combination of a resistor 62 and a by-pass capacitor 64. The capacitor 64 functions as a low impedance by-pass capacitor at the frequency of oscillation of the network 60, thereby producing a substantially constant direct current voltage at the emitter of the transistor 46. If desired, the resistor 62 can be replaced by a positive temperature coeffient resistance element which increases in resistance as voltage across the element increases, such as a standard incandescent lamp. Substituting such a device for the resistor 62 permits the potential across the emitter bias network 60 to be varied as necessary to compensate for changing load and temperature conditions.

The base bias network 54 is connected to the base of the transistor 46 and comprises the parallel combination of a by-pass capacitor 66 and a resistor 68. Similar to the biasing network 60, the resistor 68 may be replaced by an incandescent lamp to permit variance of the potential across the biasing network 54 as necessary. In addition, the resistor 68 can be replaced by a variable resistor or may be used in series with a variable resistor in order to set the quiescent biasing level of the transistor 46.

The transformer 50 includes the primary 52, the feedback winding 58 and a secondary winding 70. Although illustrated only schematically in FIG. 1, the transformer is preferrably formed such that the windings 52, 58 and 70 are provided on a generally rectangular ferrite core comprised of two opposed U-shaped pieces formed to create a 0.05 inch air gap between respective adjacent ends of the U-shaped core members. The number of turns of each of the windings is set forth below in a table illustrating representative values of the various elements of the neon suppy 10. The number of turns in the primary 52 is set, and the air gap is adjusted large enough to avoid core saturation and to establish a given inductance in the primary winding 52 which, in turn, establishes the frequency of oscillation of the oscillator 16, in conjunction with capacitor 72. The secondary-to-primary turns ratio is selected according to conventional transformer relationships to provide the requisite output voltage to excite the output load 18.

Neon and other similar gas discharge tubes are known to possess a highly non-linear voltage-current characteristic wherein substantially no current passes through the tube until the threshold excitation voltage is achieved and, thereafter, substantial and excessive currents may result unless means for limiting such current are provided. Thus, a pure "constant voltage" power source without current limiting is unsatisfactory for use with gas discharge tubes.

The geometry of the transformer 50, however, may be designed to provide the voltage source of this invention with inherent current limiting which functions, in essence, as a constant current source under the low load resistance presented by an excited gas discharge tube. This feature is achieved in a conventional manner by positioning the primary 52 and secondary 70 windings on different poles of the transformer core thereby producing a leakage reactance between these windings. Thus, even under the most severe loading conditions (a short circuit of the output of the transformer 50), the maximum current is limited by this leakage reactance.

The feedback winding 58 of the transformer 50 is connected through the diode 56 and the bias network 54 to the base of the transistor 46. As seen, the feedback winding 58 is also connected through the diode 56 to the collector of the transistor 48, for reasons described in greater detail below. The number of turns of the feedback winding 58 is selected to assure adequate feedback for oscillation and, more particularly, to force the transistor 46 into saturation over a substantial portion of each cycle as required to produce sufficient power output to drive the load 18.

The diode 56 is positioned between the feedback winding 58 and the base bias network 54 in such polarity to generally block the reverse flow of current through the winding 58. The diode 26 preferrably is a fast recovery type of diode to prevent an instantaneous reverse current from flowing following initial reverse biasing of the diode.

The primary winding 52 is connected to the base of the transistor 48 through a blocking and primary resonating capacitor 72. A resistor 74 and diode 76 are also attached to the base of the transistor 48, and the emitter of the transistor 48 is connected to the ground 30. The diode 76 is a clamping diode which limits the maximum base-to-emitter voltage of the transistor 48 to assure that the emitter-base breakdown voltage of the transistor 48 is not exceeded. The resistor 74 is connected in parallel with the diode 76 to provide a low impedance path effectively across the emitter-base junction of the transistor 48, thereby shunting, in a conventional manner, the collector-to-emitter leakage current of the transistor 48.

The purpose of the transistor 48 is to aid in rapid turn-off of the transistor 46. When the base biasing current is removed from the base of the transistor 46, charge carriers stored in the base-emitter junction of the transistor 46 normally remain, and are recombined in a natural recombination process. This recombination process results in a substantial turn-off delay and therefore gradual and dissipative turn-off of the transistor 46. With the transistor 48 being biased to conduct at the instant of desired turn-off of the transistor 46, the charge carriers stored in the base-emitter junction of the transistor 46 are rapidly evacuated through base-emitter reverse bias from the biasing network 54 and the conducting transistor 48. The rapid evacuation of the base-emitter junction of the transistor 46 occurs in a time period much shorter than that required for the natural recombination process, aiding the rapid turn-off of the transistor 46.

For the purposes of safety should a ground fault or broken neon tube occur in the output load 18, the safety bypass curcuit 17 causes the remainder of the supply 10 to revert to a low energy pulse mode which prevents any ensuing burns or a fire.

During normal operation, current from the secondary winding 70 of the transformer 50 is directed to the output load 18. Very little, if any, current flows from the center tap 80 of the winding 70. If a broken tube or ground fault in the load 18 occurs, loading of the secondary winding 70 becomes unbalanced, and an appreciable current flows from the center tap 80 to the primary winding 82 of a step-up and ground isolation transformer 84. The primary winding 82 is connected to an earth ground 86, as illustrated.

The secondary winding 88 of the transformer 84 is connected to a diode 90 whose output is directed to a filter capacitor 94, and the gate cathode of a triac or silicon controlled rectifier 96. A triac is preferred. The triac 96 is connected to the feedback winding 58 of the transformer 50 and to the ground 30.

Figure 2:
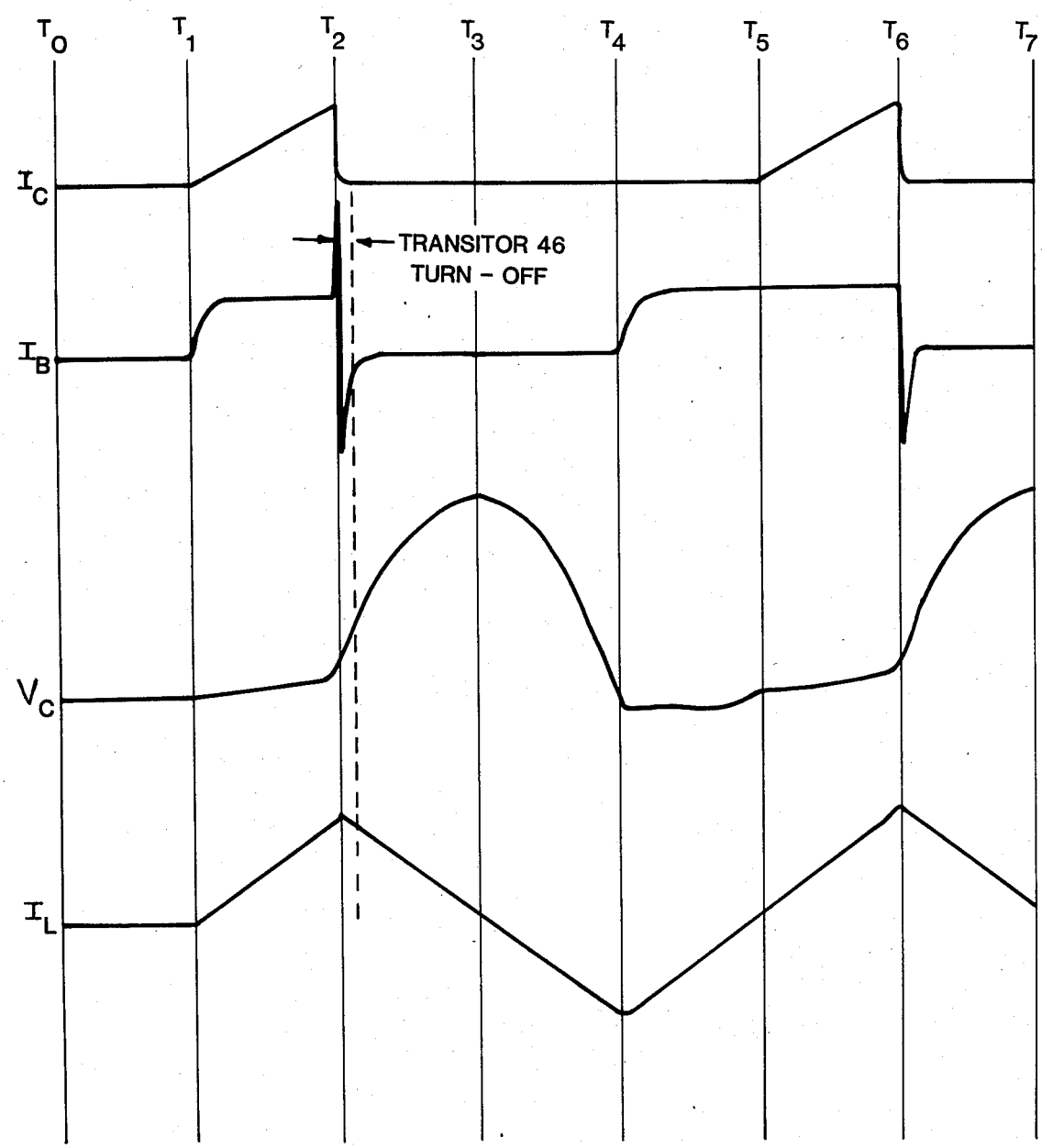
FIG. 2 illustrates representative current and voltage wave forms produced by the circuit of FIG. 1.

The operation of the neon sign supply 10 is best illustrated and understood by reference to the curves of FIG. 2 in combination with the illustrated and described circuit of FIG. 1.

When connected, line voltage on the leads 24 and 26 is rectified by the bridge 20 and appears across the capacitor 22. The start-up circuit 14 generates a series of pulses to initiate oscillation of the oscillator 16. Preferably, the start-up circuit generates pulses at a frequency of 200 Hz, settling to a steady-state pulse generation of between 10 and 20 Hz. Once the oscillator 16 is triggered into oscillation, the pulses of the start-up circuit 14 have a negligible effect and may continue without altering oscillation of the oscillator 16.

The curves shown in FIG. 2 are illustrated at various times designated $T_0$, $T_1$, $T_2$, etc. The times indicated are not intended to represent any time value, but are merely to illustrate the relative values and polarities of circuit currents and voltages at any particular instant of time.

Initially, until line voltage is connected to the leads 24 and 26, the oscillator 16 is not oscillating. At time $T_1$, line voltage is connected to the leads 24 and 26. Pulses from the start-up circuit 14 cause conduction in the transistor 46, and by virtue of the phasing of the transformer 50, a positive feedback current is supplied through the primary of the transformer 52 to the base of the transistor 46, causing a steadily increasing collector current $I_C$. At the same time, the base drive current $I_B$ of the transistor 46 is fixed, and the collector saturation voltage $V_{CSAT}$ slowly begins to rise. At time $T_2$, saturation of transistor 46 can no longer be maintained by the fixed base drive and the collector voltage $V_C$ begins to rise rapidly. At the same time, sufficient current flows to the base of the transistor 48 through the capacitor 72 to turn on the transistor 48. The turn-on phase of the transistor 48 takes a finite length of time, approximately 200 nanoseconds. When the transistor 48 is fully on, the transistor 46 is quickly turned off by a reverse base current flowing through the capacitors 64 and 54 which rapidly removes the excess charge carriers of the base-emitter junction of the transistor 46. At the same time, the current $I_L$ in the primary winding 52 has reached a maximum and maximum energy is stored therein.

When the transistor 46 is turned off, the collector voltage $V_C$ begins to rise rapidly as the current $I_L$ begins to drop, and the negative base current $I_B$ begins to diminish. Since the transistor 46 remains in a non-conducting state, as the current $I_L$ continues to decrease, the collector voltage $V_C$ of the transistor 46 reaches a maximum at time $T_3$, at which time the collector voltage begins to decrease. At the same time, the sign of $dV_C/dt$ changes, reversing current through the transistor 48 emitter-base junction, causing the transistor 48 to cease conducting. The current $I_L$ in the primary 52 then goes negative, and the collector voltage $V_C$ of the transistor 46 decreases to zero, as the reverse current in the primary 52 reaches its maximum negative value. The current $I_L$ then begins to rise until it reaches zero and becomes positive, at which time a positive base current $I_B$ is again applied to the transistor 46, causing the transistor to conduct, and the cycle described immediately above is repeated. Thus, an oscillating high frequency voltage is stepped-up by the transformer 50 and applied to energize the output load 18.

If a ground fault, broken tube, or other problems occur in the output load 18, loading of the secondary 70 of the transformer 50 becomes unbalanced, and an appreciable fault current flows from the center tap 80 to the primary winding 82 of the transformer 84. The current is transformed by the transformer 84, rectified by the diode 90, filtered by the capacitor 92, and flows through the resistor 94. If such current is sufficiently large, voltage across the resistor 94 causes a voltage drop across the gate-cathode junction of the SCR or triac 96, causing it to conduct. Conduction of the element 96 in turn causes a short circuiting of the feedback winding 58, which therefore removes the base drive triggering voltage from the transistor 46. Osillation of the osillator 16 is therefore halted. Once the osillator 16 is halted, it is not restarted until another pulse is received from the diac 40, a period of several hundred milliseconds. If the fault condition across the secondary winding 70 has not cleared, a new pulse from the diac 40 only causes a new fault current, thus repeating the above sequence of initiation of the safety bypass circuit 17. The resulting continual repetition of activation of the safety bypass circuit 17 prevents any significant power output level of the transformer 50.

The following table illustrates component value of the various elements of the invention sufficient to produce a 25 KHz output from the secondary winding 70 and to provide the safety bypass described:

| TABLE OF COMPONENT VALUES | |
|---|---|
| Component | Value |
| Transistor 46 | 1500 V collector-emitter, 2.5 A collector current |
| Transistor 48 | low voltage, 3.0 A switch |
| Transformer 50 | |
| Primary 52 | 99 turns |
| Feedback 58 | 4 turns |
| Secondary 70 | 3,400 turns |
| Capacitor 22 | 300 microfarad |
| Capacitor 66 | 470 microfarad |
| Resistor 68 | 10 ohm |
| Resistor 67 | 22 ohm |
| Resistor 62 | 1.5 ohm |
| Capacitor 64 | 470 microfarad |
| Diode 56 | Fast recovery 1N4934 |
| Capacitor 72 | .033 microfarad |
| Resistor 74 | 1000 ohm |
| Diode 76 | silicon diode 1N4001 |
| Transformer 84 | |
| Primary 82 | 12 turns |
| Secondary 88 | 20 turns |
| Core | .38" in diameter, with .187" hole and .124" thickness of Ferrite material |
| Diode 90 | 1N914 |
| Capacitor 92 | 4.7 microfarad |
| Resistor 94 | 470 ohm |
| Triac 96 | minimum 50 volt, 4–8 A anode current, 5 milliamp gate current |

It should be evident that by judicious selection of the values of the circuit elements and by selection of the number of relative turns of the primary winding 52 and secondary winding 70, the output voltage of the transformer 60 can be altered in a well-known manner.

Various changes can be made to the invention without departing from the spirit thereof or scope of the following claims.

What is claimed is:

1. A resonant supply circuit for generating high frequency, high voltage output to a gas-filled tube, comprising
   a. a transformer having leakage reactance and including a primary winding, a feedback winding and a secondary winding connected to the gas-filled tube, the transformer having a large magnetic air gap,
   b. a transistor having a base, an emitter and a collector, the collector being connected to the transformer primary winding and the base being connected to the transformer feedback winding to provide a base drive,
   c. in which voltage on the base of said transistor causes said transistor to conduct, said voltage serving to cause said transistor to conduct until said transistor saturation voltage begins to rise sinusoidally,
   d. circuit means connected to the base of said transistor to bias said transistor to delay application of conduction voltage to the base of the transistor until the collector voltage of the transistor is eliminated and to permit a rapid evacuation of charge carriers stored in the base-emitter junction of said transistor, and
   e. switch means connected to said primary winding, said switch means being operable when said transistor saturation voltage rises sinusoidally to remove said voltage from the base of said transistor to render said transistor non-conductive, said switch means further providing a path for rapid evacuation of charge carriers stored in the base-emitter junction of said transistor to render said transistor rapidly non-conductive.

2. A supply circuit according to claim 1 in which said switch means comprises a second transistor having a base, a collector and a grounded emitter, the base of said second transistor being connected to the transformer primary winding and the collector of said second transistor being connected to the base of said first transistor to provide said path.

3. A supply circuit according to claim 1 in which said circuit means comprises a biasing network connected between the base of said transistor and the transformer feedback winding.

4. A supply circuit according to claim 3 in which said biasing network comprises a capacitor in parallel with a resistor, said capacitor and resistor having a time constant much longer than the resonant period of said supply circuit.

5. A supply circuit according to claim 1 including means connected to the base of said transistor to cause said transistor to conduct when said circuit is initially energized.

6. A supply circuit according to claim 5 in which said means to cause said transistor to conduct comprises a relaxation oscillator.

7. A supply circuit according to claim 1 in which said circuit means comprises a biasing network connected to the emitter of said transistor, said network comprising a capacitor in parallel with a resistor.

8. A supply circuit according to claim 1 including means to prevent reverse current flow through the transformer feedback winding.

9. A supply circuit according to claim 8 in which said means to prevent reverse current flow comprises a fast recovery diode located between the base of said transistor and the feedback winding.

10. A supply circuit according to claim 1 including bypass means to remove the base drive from said transistor.

11. A supply circuit according to claim 10 in which said bypass means comprises a gate connected to said feedback winding which, when conducting, short circuits the feedback winding.

12. A supply circuit according to claim 11 in which said gate comprises a silicon-controlled rectifier, said rectifier being activated by an unbalance of said secondary winding.

13. A supply circuit according to claim 11 in which said gate comprises a triac, said triac being activated by an unbalance of said secondary winding.

14. A supply circuit according to claim 11 including a second transformer having a primary connected to a center tap of said secondary winding and having a secondary connected to said gate to activate said gate when said secondary winding is unbalanced.

15. A supply circuit according to claim 2 including a capacitor connected between the base of said second transistor and the transformer primary winding, said capacitor controlling said switch means and comprising means to cause resonating of said transformer.

* * * * *